United States Patent [19]
Bowen

[11] Patent Number: 6,072,569
[45] Date of Patent: Jun. 6, 2000

[54] APPARATUS AND A METHOD FOR MEASUREMENT OF WEDGE IN OPTICAL COMPONENTS

[75] Inventor: John P. Bowen, Rochester, N.Y.

[73] Assignee: Eastman Kodak Company, Rochester, N.Y.

[21] Appl. No.: 09/094,245

[22] Filed: Jun. 9, 1998

[51] Int. Cl.[7] .................................................. G01B 11/24
[52] U.S. Cl. ...................... 356/124; 356/376; 356/243.1; 356/244
[58] Field of Search ................................. 356/376, 243.1, 356/243.4, 244, 124; 33/507

[56] References Cited

U.S. PATENT DOCUMENTS

| 4,537,473 | 8/1985 | Maschmeyer . | |
| 5,175,601 | 12/1992 | Fitts | 356/376 |
| 5,262,835 | 11/1993 | Lindquist et al. | 356/376 |
| 5,831,719 | 11/1998 | Berg et al. | 356/376 |

Primary Examiner—Richard A. Rosenberger
Attorney, Agent, or Firm—Svetlana Z. Short

[57] ABSTRACT

According to one aspect of the present invention, a method for determining orientation of one surface of an optical component relative to another surface of the optical component comprises: (a) placing the optical component into a test fixture having certain characteristics from which differences in test fixture orientation and position can be determined, so that the one surface of the optical component is accessible in one orientation of the test fixture and the other surface of the optical component is accessible in another orientation of the test fixture; (b) measuring surface profile and orientation of the one surface of the optical component with the test fixture in one orientation; (c) measuring surface profile and orientation of the second surface of the optical component with the test fixture in second orientation; and (d) determining profile and relative orientation of the one surface of the optical component with respect to the another surface of the optical component by nulling out differences between the first and second orientation of the test fixture.

13 Claims, 10 Drawing Sheets

APPARATUS AND A METHOD FOR MEASUREMENT OF WEDGE IN OPTICAL COMPONENTS

FIELD OF INVENTION

The invention relates to an apparatus and method for measuring surface locations and surface shapes of optical components. More specifically, the invention relates to an apparatus and a method for measuring the relative location of the front and rear surfaces of optical components, and to determine misalignments between the optical axes of the two surfaces.

BACKGROUND OF THE INVENTION

Optical components have at least two surfaces, a front surface and a rear surface. The front surface is an object facing surface and the rear surface is an image facing surface. During fabrication of optical components, such as prisms, aspheric (Schmidt) plates, lens components (such as single lens components or cemented lens components), it is desirable to control and thus to measure the relative position of the front and rear surfaces with respect to one another.

A lens component may have spherical or aspherical surfaces. A lens surface is usually defined by the location of its vertex, the direction of its optical axis (which is normal to the surface at the vertex), and an aspheric equation including aspheric coefficients describing that surface. In a spherical surface the aspheric coefficients are zero. A lens component with two aspheric surfaces is called a biaspheric lens component. In a lens component, the relative angular separation between the two optical axes (of its respective surfaces) is referred to as wedge (see FIG. 1). The shortest distance between the two optical axes is called decenter. This distance is usually measured along the shortest line that connects one optical axis to the other optical axis, and that line originates at one of the surface vertices.

Measuring devices for measuring individual surface shapes are known. Both surfaces of a lens component need to be measured with such a device in order to determine the relative position of each surface with respect to the other surface. Since the surfaces are on opposite sides of a lens component it is difficult to measure the two surfaces without moving the lens component or the measuring device. Usually, an optical technician utilizes an optical or mechanical device that can measure characteristics of only one surface at a time. To measure the surfaces of the lens component relative to each other, the technician may keep the lens component stationary and move the measuring device around the lens component, measuring one surface at a time. Because the measuring device is much bigger and heavier than the lens component, this approach is inconvenient.

Mechanical surface measuring devices such as profilometers are known. Previously, most profilometers have performed measurements in two dimensions. These profilometers do not provide the high degree of accuracy required for measurements of surface profiles of precision optical components.

Recently, more accurate profilometers that measure in three dimensions have become available. Such profilometers are commercially available from Panasonic Factory Automation, Chicago, Ill. These profilometers are designed to measure aspherical or spherical surface profiles over a workspace of several inches. They use a single vertically oriented probe that travels in the vertical direction (up and down) as well as in a horizontal plane. These profilometers measure a surface profile on one surface of a lens component at a time and determine the orientation of an optical axis of that surface. However, in order to measure the orientation of two surfaces with respect to one another, the lens component must be turned over so that its second surface can also be measured. This movement of the lens component introduces an uncertainty in measuring the relative positions of the front surface of the lens component with respect to its rear surface and produces inaccurate results. The same problem occurs if one uses an interferometer or another measuring device, instead of a profilometer.

SUMMARY OF THE INVENTION

According to the present invention a method for determining orientation of one surface of an optical component relative to another surface of the optical component comprises:

a) placing the optical component into a test fixture having certain characteristics from which differences in test fixture orientation can be determined, so that the one surface of the optical component is accessible in one orientation of the test fixture and the other surface of the optical component is accessible in another orientation of the test fixture; b) measuring surface profile and orientation of the one surface of the optical component with the test fixture in one orientation; c) measuring surface profile and orientation of the second surface of the optical component with the test fixture in second orientation; and d) determining profile and relative orientation of the one surface of the optical component with respect to another surface of the optical component by compensating for differences between the first and second orientation of the test fixture.

According to an embodiment of the present invention, an apparatus comprises:

a) a device for measuring a surface profile of an optical surface of an optical component b) a test fixture capable of being supported by the support stage, the test fixture including (i) a plurality of reference bodies, and (ii) a receptacle for receiving an optical component.

DETAILED DESCRIPTION

The following is a description of a device and a method for measuring the relative displacement and wedge of two aspheric surfaces of an optical component with respect to one another. It will be understood that other optical surfaces, such as spherical or planar surfaces, are special cases of aspherical surfaces and can be tested with the same apparatus and by the same method as taught herein.

Figure 1:
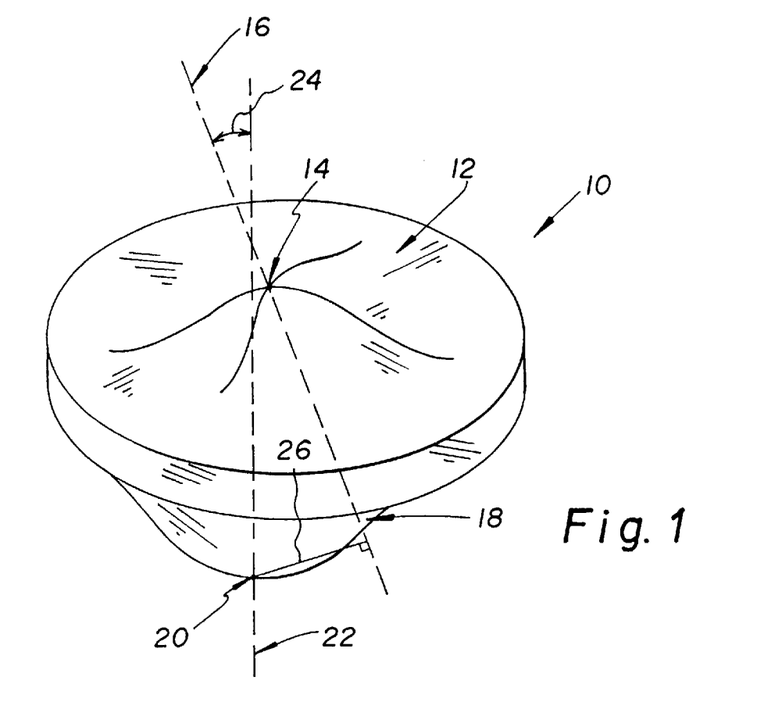
FIG. 1 illustrates a biaspheric lens component with two surfaces that are decentered and tilted with respect to one another.

FIG. 1 depicts a biaspheric lens component 10. The first aspheric surface 12 of the lens component 10 is characterized by a first vertex 14 and a first optical axis 16. The second aspheric surface 18 of the lens component 10 is characterized by a second vertex 20 and a second optical axis 22. Because the surfaces 12 and 18 are tilted with respect to one another, the optical axes 16 and 22 are tilted with respect to one another, forming the wedge 24. The optical axes may also be decentered with respect to one another. The decenter 26 between the optical axes 16 and 22 is the minimum distance between the second vertex 20 (located on the second optical axis 22) and the first optical axis 16. (See FIG. 1.)

Figure 2:
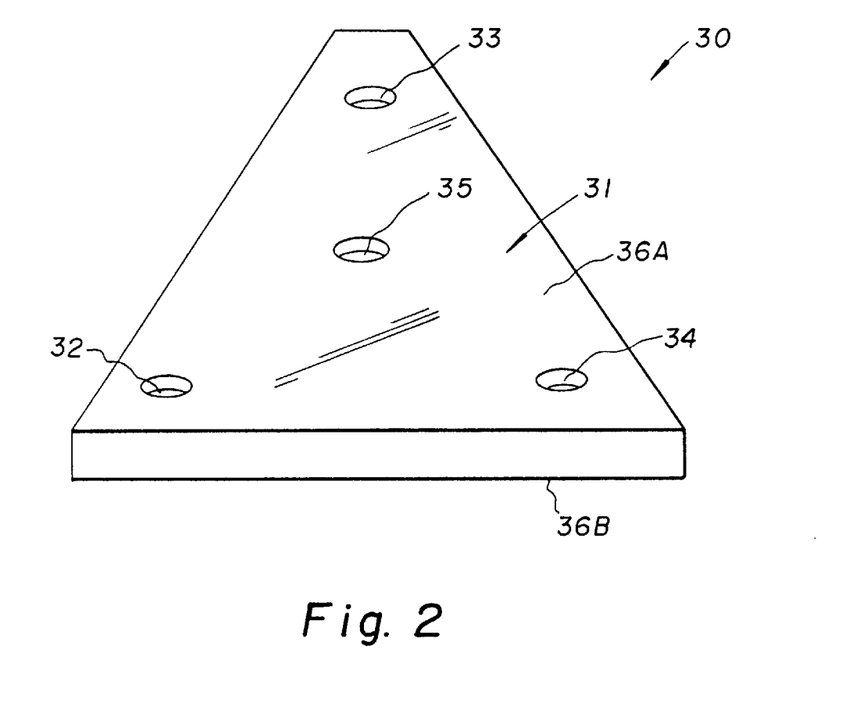
FIG. 2 illustrates a test fixture without a lens component and without a plurality of reference bodies.

According to an embodiment of the present invention an improved apparatus for measurement of the wedge 24 and decenter 26 of the lens component 10 includes: (i) a profilometer, interferometer, or another device capable of measuring the location of the center of curvature of an optical surface, the location of the optical axis of a surface, or the location of the surface itself, or the direction of the optical axis, (ii) a test fixture 30, (iii) and an optional seat for the test fixture 30. According to one embodiment, the test fixture 30 includes a plate 31 with four holes 32, 33, 34, 35 (see FIG. 2) and a set of reference bodies. The plate 31 has a first surface 36A and a second surface 36B and the holes extend through the thickness of the plate 31 and can be accessed from either the first surface 36A or second surface 36B.

The lens component 10 is placed into the fourth hole, i.e., hole 35. (see FIGS. 3A and 3B) More specifically, the fourth hole of the plate 31 is sized so as to hold a lens mount 37. The lens mount 37 fits snugly into the hole 35 and holds the lens component 10 in a fixed position with respect to the plate 31. Alternatively, a lens component 10 can be placed directly into the fourth hole 35.

Figure 3A:
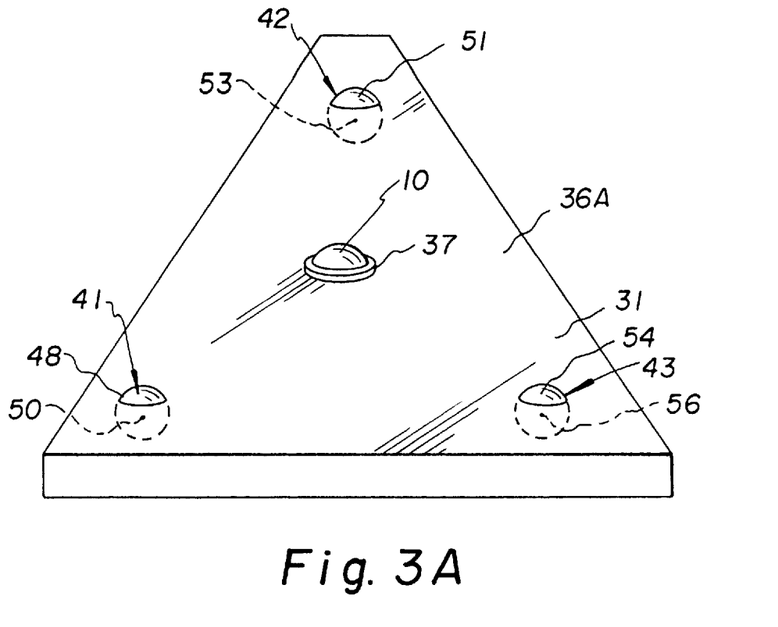
FIG. 3A illustrates a top view of a test fixture with the lens component mounted in the test plate.
Figure 3B:
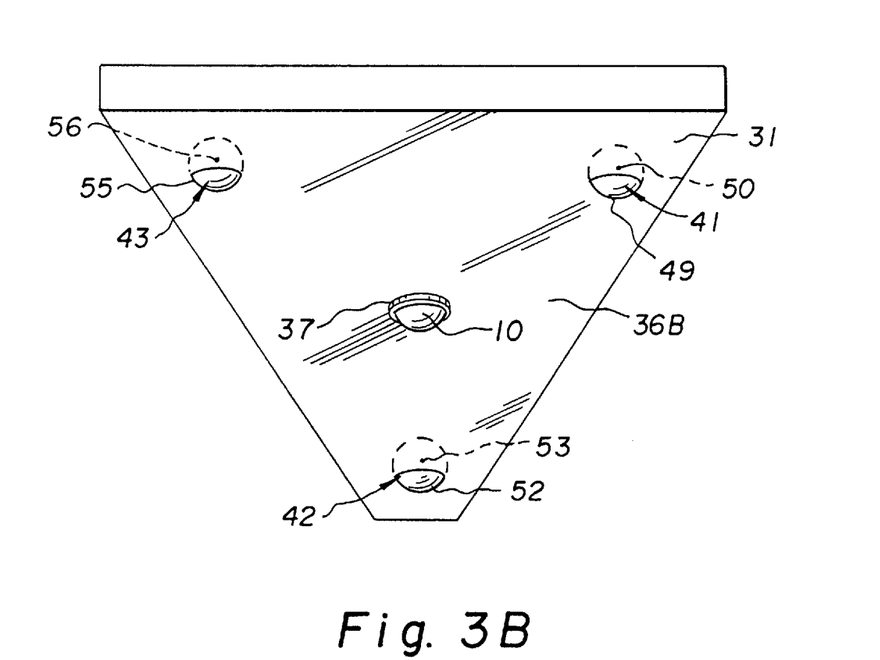
FIG. 3B illustrates the bottom view of the test fixture with the lens component mounted in the test plate.

Three reference bodies are placed into the holes 32, 33, 34. The reference bodies are fixed in position with respect to the plate 31 and thus are in a fixed position with respect to the lens component 10. For example, the reference bodies can be fixed in position by the use of epoxy. Other ways of holding the reference bodies in their locations may also be used. In the preferred embodiment, the reference bodies are three spherical balls. They are shown in FIGS. 3A and 3B as the first ball 41, the second ball 42, and the third ball 43. The first ball 41 has a first surface 48, a second surface 49, and a center 50. The second ball 42 has a first surface 51, a second surface 52, and a center 53. The third ball 43 has a first surface 54, a second surface 55, and a center 56. The balls 41, 42, 43 are mounted approximately in a triangular pattern in the plate 31. The balls 41, 42, 43 are mounted such that the first surfaces 48, 51, 54 of the three balls are oriented towards the first surface 36A of the plate 31 and the second surfaces 49, 52, 55 are oriented towards the second surface 36B of the plate 31. The triangular pattern of the balls 41, 42, 43 in the plate 31 provides an advantage due to symmetry, but is not critical for the operation of the invention. The plate 31 is of a thickness such that each ball 41, 42, 43 protrudes from and is accessible from both sides of the plate 31. It is preferred that the balls 41, 42 and 43 protrude from the plate 31.

Figure 4:
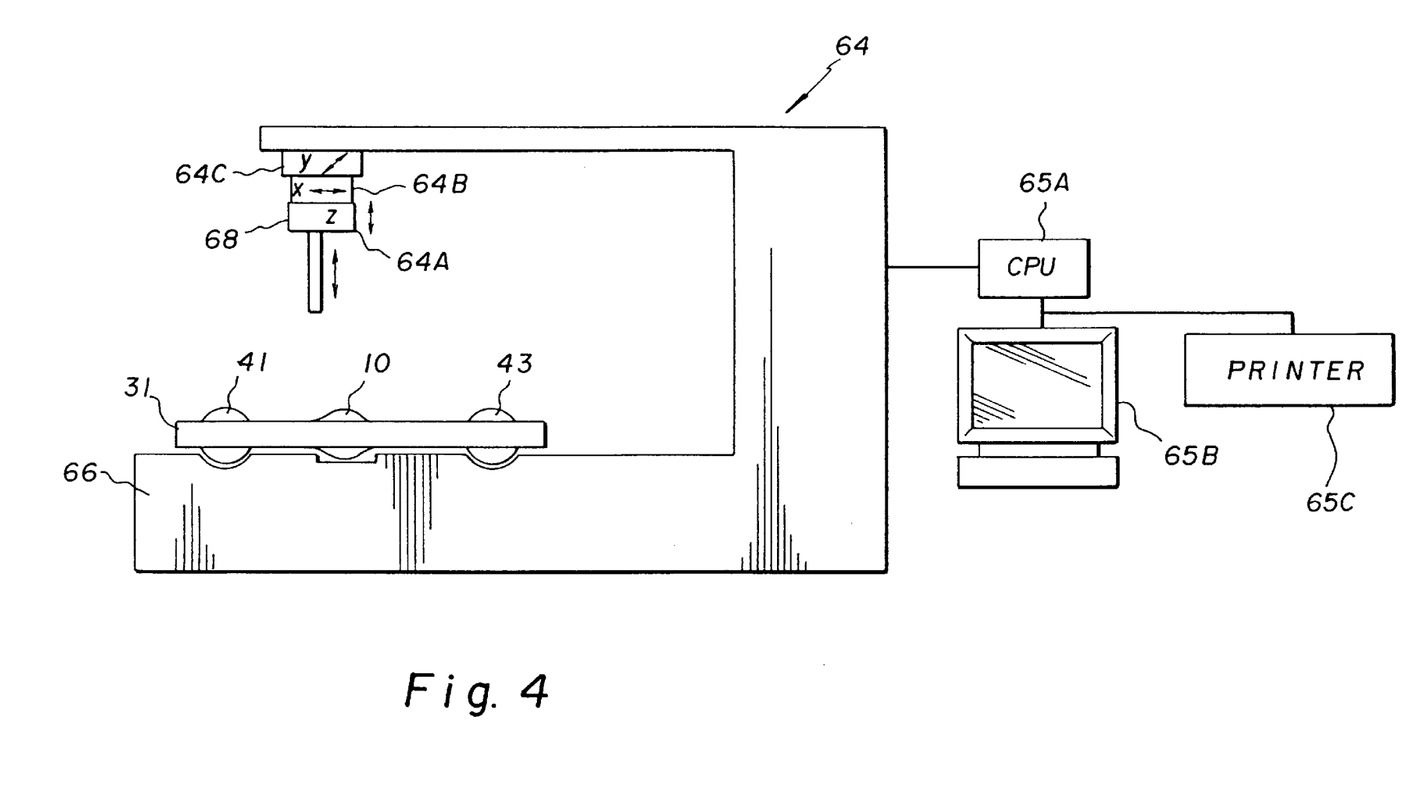
FIG. 4 illustrates a profilometer and the test fixture of FIGS. 2, 3A and 3B.

According to this embodiment, the improved apparatus for measuring the relative location of the front and rear surfaces of optical components includes a profilometer 64 with an optional seat 66. FIG. 4 shows a lens test fixture 30 mounted on a seat 66 of the profilometer 64. It is preferred that the profilometer 64 be of extremely high accuracy (such that it can measure the surface to an accuracy of about 0.1 micrometers.) This profilometer has a probe 68, oriented in the vertical direction. This probe is attached to three stages 64A, 64B, 64C and moves with these stages. The stage 64A moves in a vertical direction (z direction), while stages 64B and 64C move the probe in horizontal directions (x and y). Such a profilometer can be obtained from Panasonic Factory Automation, Chicago, Ill. The plate 31 is mounted on the seat 66 such that either the first surface 36A or the second surface 36B of the plate 31 is facing the probe 68 of the profilometer 64. The profilometer is used to scan a surface of a lens component so as to determine its shape, orientation of its optical axis, and the location of its vertex. More specifically, the profilometer probe traverses the surface of the lens component and generates signals representing the location of a given point on the surface of the lens component. These signals represent a set of measurements defining the shape of the profile. The signals are processed by a processor 65A that generates numerical data describing the surface and this data may be displayed on a monitor 65B or is printed on a printer 65C. Thus, the profilometer 64 performs a series of measurements on the lens component.

Figure 5:
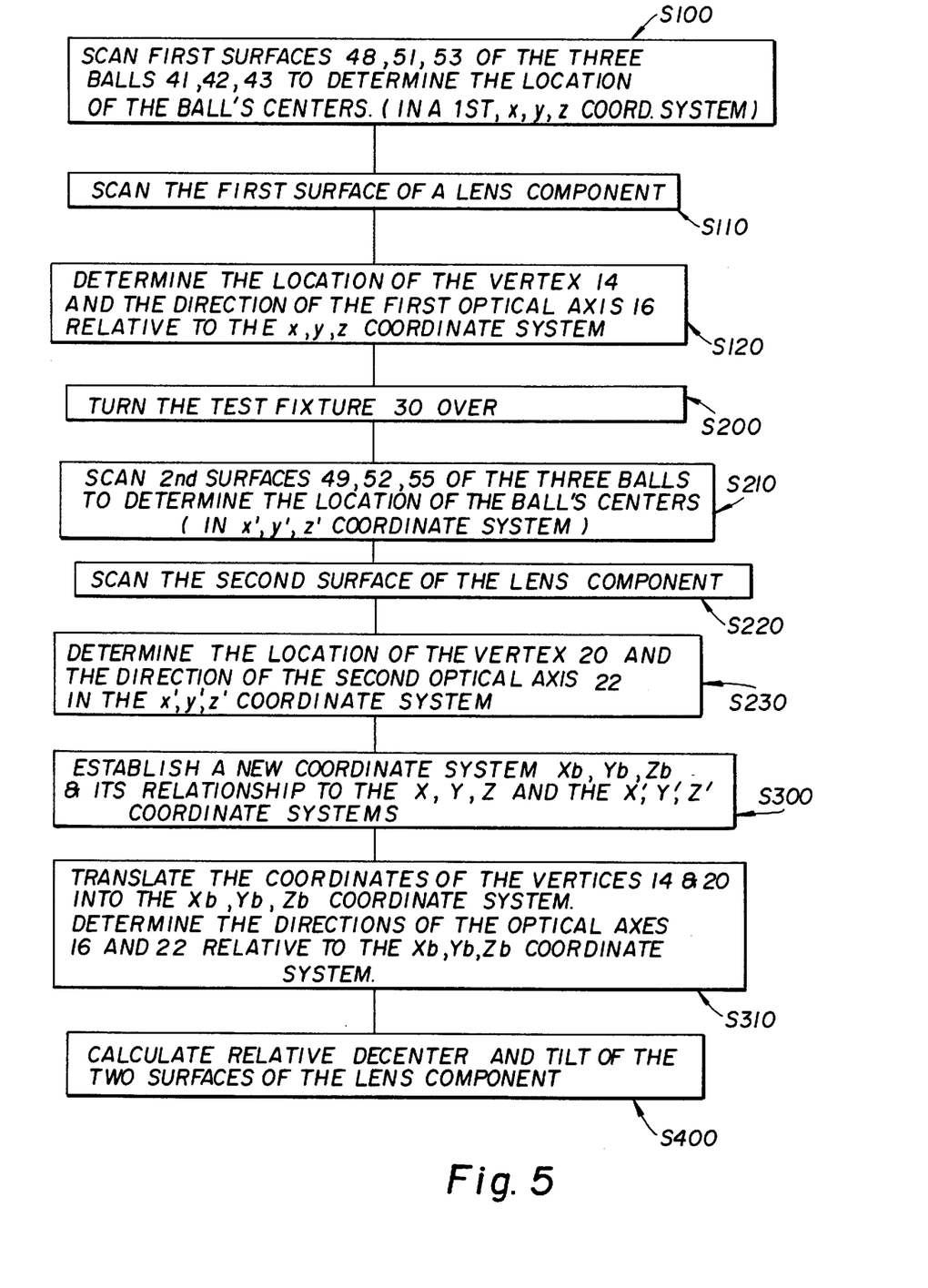
FIG. 5A is a flow chart of the procedure for measuring wedge and decenter of an optical component.

The procedure for these measurements is as follows: first, the lens component 10 is inserted into the hole 35 of the plate 31. The plate 31, including the three balls 41, 42, 43 and the lens component 10 is mounted upon the seat 66 of the profilometer 64. The technician uses the profilometer 64 to obtain a first set of measurements. More specifically, the first surfaces the of the three balls 41, 42, 43 are scanned in order to determine the location of their centers 50, 53, 56. (step S100, FIG. 5) Because the balls are spherical, the location of the centers can be easily determined by determining the radius of curvature of the ball's surface. The profilometer is also used to measure first surface of the lens component 10 (step S110) to determine the location of the first vertex 14 and the orientation of the first optical axis 16 with respect to the location of the ball centers 50, 53, 56 (step S120). This is described in more detail later in the specification.

The technician will then turn the lens test fixture 30 over so that its surface 36B is accessible to the probe 68 (step S200). The profilometer 64 is then used to obtain a second set of measurements. The second surfaces of the three balls 41, 42, 43 and the second surface of the lens component 10 are scanned to determine the location of the centers 50, 53, 56 of the three balls (step S210, S220) and the location of the second vertex 20 and the second optical axis 22 of the lens component with respect to the location of the centers 50, 53, 56 (step S230).

Knowing the relative location of the centers 50, 53, 56 of the balls with respect to the surfaces of the lens component, the technician can find the relative location of the vertices 14, 20 (with respect to one another) and the directions of the optical axes 16, 22 (with respect to one another) (step 400). The method steps summarized above are described in more detail below.

Figure 6A:
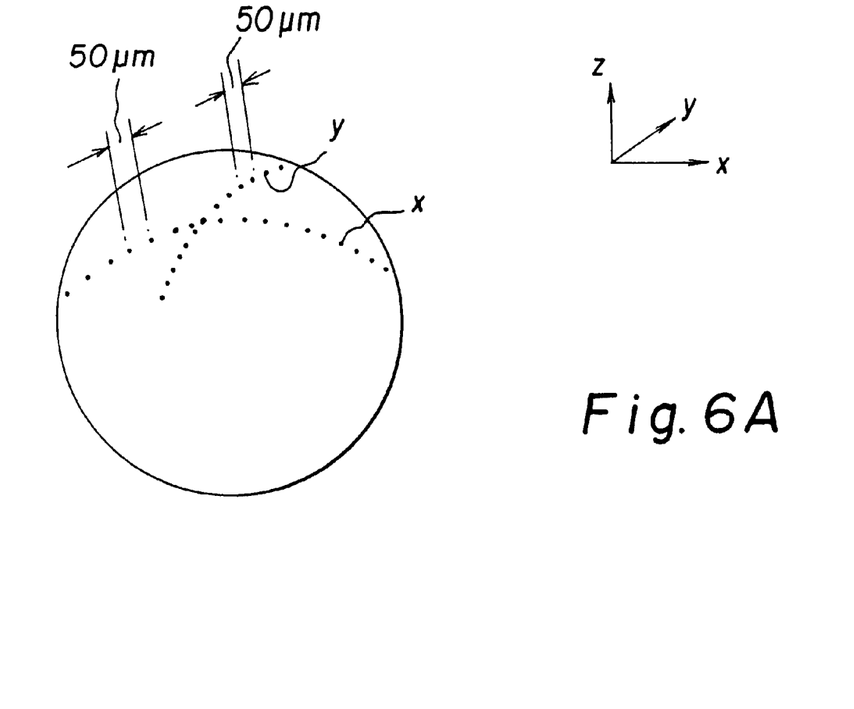
FIG. 6A illustrates a set of sampling points measured during an xz and yz scan on a surface.

The first set of measurements (step S100, S120) is performed as follows. According to the first embodiment of the present invention, the measurements are taken along two orthogonal directions (x and y) at approximately 50 µm (50 microns) intervals (FIG. 6A). First, the first surface 48 of the first ball 41 is measured by the profilometer in order to determine the location of the center 50 of the first ball 41. Those knowledgeable in the art will understand that a series of measurements can be performed relative to an arbitrary fixed point. Thus, we can arbitrarily define the (x,y,z) coordinate for the center 50 of the first ball 41 to be the origin of the first coordinate system of the profilometer, and hence the (x,y,z) coordinate of the first ball 41 is ($x_1=0$, $y_1=0$, $z_1=0$). Therefore, the unit vectors $\hat{x}$, $\hat{y}$, $\hat{z}$ of this coordinate system originate at this point. A right-hand Cartesian coordinate system was used for this coordinate system.

The first surface 51 of the second ball 42 is scanned by the probe 68 of the profilometer 64 in order to determine the location of the center 53 of the second ball. The center 53 of the second ball 42 is described by the set of coordinates ($x_2$, $y_2$, $z_2$).

The first surface 54 of the third ball 43 is scanned by the probe 68 of the profilometer 64 in order to determine the location of the center 56 of the third ball 43. The center 56 of the third ball 43 is described by the set of coordinates ($x_3$, $y_3$, $z_3$).

The first surface 12 of the lens component 10 is crowned (to determine the location of its highest or lowest point) and is then scanned through this point by the probe 68 of the profilometer 64 (step S110) in order to determine the location of the first vertex 14 and the direction of the first optical axis 16. (step S120, FIG. 5). More specifically, x-z and y-z surface profiles are obtained by scanning surface 12 in two orthogonal directions and taking measurements of points located approximately 50 to 100 µm apart. This completes the first set of measurements. The location of the vertex and the orientation of the optical axis is obtained mathematically from this set of measurements. The first vertex 14 is then described by the set of coordinates ($x_4$, $y_4$, $z_4$) and the direction of the first optical axis 16 is described by direction cosines ($\alpha_4$, $\beta_4$, $\gamma_4$).

The plate 31 is turned over (step 200) to allow the second surface 36B of the test plate 31 to be facing the probe 68 of the profilometer 64. During measurements after the plate 31 is turned over, the balls 41, 42, 43 are re-identified as such for the second set of measurements. That is, the ball identified as the first ball 41 for the measurements on the first surface of the plate 31 is identified again as the first ball 41 for the purpose of further measurements. The ball identified as the second ball 42 for the measurements on the first surface of the plate 31 is re-identified as the second ball. The ball identified as the third ball 43 for the measurements on the first surface of the plate 31 is re-identified as the third ball 43. The profilometer 64 then performs the second set of measurements (steps S210–S230).

More specifically, the second surface 49 of the first ball 41 is scanned in order to again determine the location of the center 50 of the first ball. The next three measurements are performed (in a second x', y, z' coordinate system) relative to the center 50 of the first ball 41, as measured from the second surface 49 of the first ball 41. For the series of measurements done for the second surface of balls 41, 42, 43 we arbitrarily define the coordinates for the center 50 of the first ball 41 to be the origin of the second coordinate system of the profilometer, and hence the coordinates for the center 50 of the first ball 41 are ($x'_1=0$, $y'_1=0$, $z'_1=0$). The unit vectors $\hat{x}'$, $\hat{y}'$, $\hat{z}'$ of the second coordinate system of the profilometer originate from this point. A right-hand Cartesian coordinate system was used for the coordinate system of the profilometer. It is noted that the physical location of the center 50 of the first ball may be different from that obtained by the first set of measurements.

The second surface 52 of the second ball 42 is scanned in order to determine the location of the center 53 of the second ball 42. The center 53 of the second ball 42 is described by the set of coordinates ($x'_2$, $y'_2$, $z'_2$).

The second surface 55 of the third ball 43 is scanned in order to determine the location of the center 56 of the third ball 43. The center 56 of the third ball 43 is described by the set of coordinates ($x'_3$, $y'_3$, $z'_3$).

It is noted that the coordinates for the centers of the second and third ball are usually not the same as those obtained from the measurements performed on the first surface, because the plate 31 has been turned over. That is, generally, ($x_2$, $y_2$, $z_2$)≠($x'_2$, $y'_2$, $z'_2$), and($x_3$, $y_3$, $z_3$)≠($x'_3$, $y'_3$, $z'_3$). The determination of the coordinates ($x'_1=0$, $y'_1=0$, $z'_1=0$), ($x'_2$, $y'_2$, $z'_2$) and ($x'_3$, $y'_3$, $z'_3$) is shown as step S210 in FIG. 5.

The second surface 18 of the lens component 10 is scanned (step 220) in order to determine the location of the second vertex 20 and the direction of the second optical axis 22. The second vertex 20 is described by the set of coordinates ($x'_4$, $y'_4$, $z'_4$) and the direction of the second optical axis 22 is described by the direction cosines ($\alpha'_4$, $\beta'_4$, $\gamma'_4$) (It is understood that all of these coordinates are given in a second coordinate system (defined by the unit vectors $\hat{x}'$, $\hat{y}'$, $\hat{z}'$), with the origin at the center 50 of the first ball 41.) This is shown as step 230 in FIG. 5. This completes the second set of measurements.

A new right-handed Cartesian coordinate system called the ball coordinate system, with unit vectors $\hat{x}_b$, $\hat{y}_b$, $\hat{z}_b$ is established next (step S300). This new coordinate system provides the means to relate the first set of measurements taken in the first coordinate system to the second set of measurements taken in the second coordinate system. More specifically, the first and the second set of measurements obtained on the first and second surfaces of the lens component are translated into the ball coordinate system as described below.

The ball coordinate system is defined by the location of the three ball centers 50, 53, and 56. It is constructed using the following steps.

The origin 80 of the ball coordinate system will be defined to be at the center 50 of the first ball 41. See FIG. 6B. Thus, the center of the first ball 41 is defined as (0, 0, 0). The unit axis $\hat{x}_b$ of the ball coordinate system is defined to point from the center 50 of the first ball 41 to the center 53 of the second ball 42. The unit axis $\hat{y}_b$ of the ball coordinate system is defined to be at 90 degrees from the unit axis $\hat{x}_b$, and is located in the plane that contains the center 50 of the first ball 41, the center 53 of the second ball 42, and the center 56 of the third ball 43. The unit axis $\hat{z}_b$ of the ball coordinate system is defined to be at 90 degrees from the x axis $\hat{x}_b$, and is perpendicular to the plane that contains the center 50 of the first ball 41, the center 53 of the second ball 42, and the center 56 of the third ball 43.

The unit coordinate vectors $\hat{x}_b$, $\hat{y}_b$, and $\hat{z}_b$ of the ball coordinate system are described by direction cosines $\alpha_1$, $\beta_1$, $\gamma_1$; $\alpha_2$, $\beta_2$, $\gamma_2$; and $\alpha_3$, $\beta_3$, $\gamma_3$. More specifically, $\alpha_1$, $\beta_1$, $\gamma_1$ are the direction cosines of the unit vector $\hat{x}_b$ with respect to the $\hat{x}$, $\hat{y}$, $\hat{z}$ unit vectors of the profilometer's first coordinate system. Similarly, $\alpha_2$, $\beta_2$, $\gamma_2$ are the direction cosines between the unit vector $\hat{y}_b$ and the $\hat{x}$, $\hat{y}$, $\hat{z}$ vectors of the first coordinate system, respectively. Similarly, $\alpha_3$, $\beta_3$, $\gamma_3$ are the direction cosines for the unit vector $\hat{z}_b$ with respect to the $\hat{x}$, $\hat{y}$, $\hat{z}$ vectors of the first coordinate system. Thus, the direction cosines relate the unit vectors $\hat{x}_b$, $\hat{y}_b$, and $\hat{z}_b$ to the profilometer's first coordinate system. The unit vectors of the new coordinate system are, therefore, described as $$\hat{x}_b=(\alpha_1,\beta_1,\gamma_1),\ \hat{y}_b=(\alpha_2,\beta_2,\gamma_2),\ \hat{z}_b=(\alpha_3,\beta_3,\gamma_3) \quad (1)$$

Figure 6B:
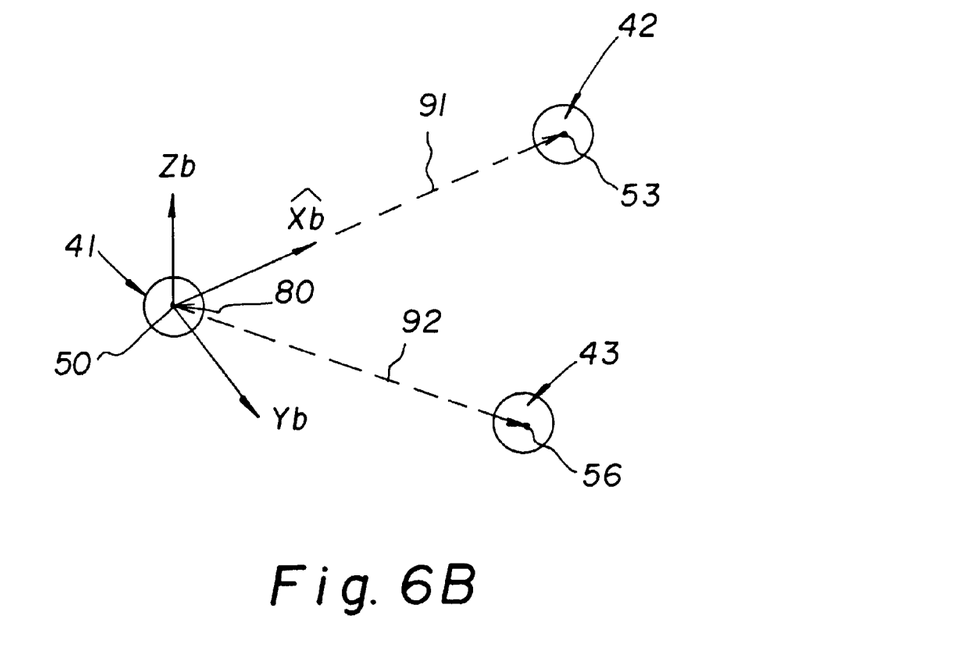
FIG. 6B illustrates a ball coordinate system and a plurality of reference bodies.

The direction cosines $\alpha_1$, $\beta_1$, $\gamma_1$ of the unit vector $\hat{x}_b$ relate to the first set of measurements taken on the first ball 41 and second ball 42. As stated above, the center of the first ball 91 has coordinates (0,0,0). The center of the second ball 42 has coordinates $(x_2, y_2, z_2)$. Therefore, $$\alpha_1 = \frac{x_2}{\sqrt{x_2^2+y_2^2+z_2^2}} \quad (2a)$$

$$\beta_1 = \frac{y_2}{\sqrt{x_2^2+y_2^2+z_2^2}} \quad (2b)$$

$$\gamma_1 = \frac{z_2}{\sqrt{x_2^2+y_2^2+z_2^2}} \quad (2c)$$

where $x_2$, $y_2$, $z_2$ are the coordinates of the second ball's center 53 in the profilometer's first coordinate system. Vector $\hat{z}_b$ is the third unit vector of the ball coordinate system and is defined by the cross product of the vector 91 and vector 92, normalized by the magnitude of the cross product. As can be seen from FIG. 6, vector 91 extends from the origin 80 to the center 53 of the second ball 42. Vector 92 extends from the origin 80 to the center 56 of the third ball 43. (See FIG. 6).

$$\hat{z}_b = \frac{\text{vector 91} \times \text{vector 92}}{|\text{vector 91} \times \text{vector 92}|} \quad (3)$$

Since vector 91 extends from the origin (0,0,0) to the point $(x_2, y_2, z_2)$ and vector 92 extends from the origin to the point $(x_3, y_3, z_3)$, the unit vector $\hat{z}_b$ is defined as $$\hat{z}_b = \frac{(x_2,y_2,z_2)\times(x_3,y_3,z_3)}{|(x_2,y_2,z_2)\times(x_3,y_3,z_3)|} \quad (4)$$

Thus, $$\hat{z}_b = (\alpha_3,\beta_3,\gamma_3) = \frac{(y_2z_3-z_2y_3,\ x_2z_3-z_2x_3,\ x_2y_3-y_2x_3)}{|(y_2z_3-z_2y_3,\ x_2z_3-z_2x_3,\ x_2y_3-y_2x_3)|} \quad (5)$$

Therefore, $$\alpha_3 = \frac{(y_2z_3-z_2y_3)}{|(y_2z_3-z_2y_3,\ x_2z_3-z_2x_3,\ x_2y_3-y_2x_3)|} \quad (6a)$$

$$\beta_3 = \frac{(y_2z_3-z_2y_3)}{|(y_2z_3-z_2y_3,\ x_2z_3-z_2x_3,\ x_2y_3-y_2x_3)|} \quad (6b)$$

$$\gamma_3 = \frac{(y_2z_3-z_2y_3)}{|(y_2z_3-z_2y_3,\ x_2z_3-z_2x_3,\ x_2y_3-y_2x_3)|} \quad (6c)$$

For a Cartesian coordinate system, $\hat{y}_b$ is defined as the cross-product of $\hat{z}_b$ and $\hat{x}_b$, so $$\hat{y}_b = (\alpha_2,\beta_2,\gamma_2) = \hat{z}_b \times \hat{x}_b \quad (7)$$

or $$\hat{y}_b = (\alpha_2,\beta_2,\gamma_2) = (\alpha_3,\beta_3,\gamma_3) \times (\alpha_1,\beta_1,\gamma_1) \quad (8)$$

Substituting the known quantities from Equations 2a–2c and Equations 6a–6c in to Equation (8), we obtain the direction cosines for the vector $\hat{y}_b$ in the ball coordinate system:

$$\hat{y}_b = \frac{(\beta_3\gamma_1-\gamma_3\beta_1,\ \alpha_3\gamma_1-\gamma_3\alpha_1,\ \alpha_3\beta_1-\beta_3\alpha_1)}{|(\beta_3\gamma_1-\gamma_3\beta_1,\ \alpha_3\gamma_1-\gamma_3\alpha_1,\ \alpha_3\beta_1-\beta_3\alpha_1)|} \quad (9)$$

The directions cosines for the unit vector $\hat{y}_b$ then are:

$$\alpha_2 = \frac{(\beta_3\gamma_1-\gamma_3\beta_1)}{|(\beta_3\gamma_1-\gamma_3\beta_1,\ \alpha_3\gamma_1-\gamma_3\alpha_1,\ \alpha_3\beta_1-\beta_3\alpha_1)|} \quad (10a)$$

$$\beta_2 = \frac{(\alpha_3\gamma_1-\gamma_3\alpha_1)}{|(\beta_3\gamma_1-\gamma_3\beta_1,\ \alpha_3\gamma_1-\gamma_3\alpha_1,\ \alpha_3\beta_1-\beta_3\alpha_1)|} \quad (10b)$$

$$\gamma_2 = \frac{(\alpha_3\gamma_1-\gamma_3\alpha_1)}{|(\beta_3\gamma_1-\gamma_3\beta_1,\ \alpha_3\gamma_1-\gamma_3\alpha_1,\ \alpha_3\beta_1-\beta_3\alpha_1)|} \quad (10c)$$

All of the quantities on the right hand side of Equation 10 are known from Equations 2a–2c and 6a–6c. We have now a full description of the ball coordinates system given by Equation (1) and its relationship to the first coordinate system, defined by the $\hat{x}$, $\hat{y}$, and $\hat{z}$ unit vectors. That is, the ball coordinate system is defined by the three triplets of direction cosines from Equations 2a–2c, 6a–6c, and 10a–10c, which in turn are defined by the centers of the three balls $(x_1, y_1, z_1)$, $(x_2, y_2, z_2)$, and $(x_3, y_3, z_3)$. The relationship of the ball coordinate system to the second coordinate system defined by the unit vectors $\hat{x}'$, $\hat{y}'$, $\hat{z}$ is described by a similar equation. This is described in detail later on in the specification. This complete step S300 shown in FIG. 5.

The next step (S310) is to translate the vertex and axis data for the lens component 10 from profilometer coordinates x, y, z and x', y', z' to the ball coordinate system coordinates $x_b$, $y_b$, $z_b$. The translation from the first set of measurements to the ball coordinate system is as follows:

As described above, the unit vectors $\hat{x}_b$, $\hat{y}_b$, and $\hat{z}_b$ are described by the following direction cosines $$\hat{x}_b = (\alpha_1, \beta_1, \gamma_1)$$

$$\hat{y}_b = (\alpha_2, \beta_2, \gamma_2)$$

$$\hat{z}_b = (\alpha_3, \beta_3, \gamma_3)$$

A coordinate transformation equation 11 is provided as follows: If a new coordinate system has direction cosines for its unit axes $\hat{x}b$, $\hat{y}b$, $\hat{z}b$ of $(\alpha_1, \beta_1, \gamma_1)$, $(\alpha_2, \beta_2, \gamma_2)$, $(\alpha_3, \beta_3, \gamma_3)$ with respect to a first coordinate system, respectively, then a point (xi, yi, zi) in the first coordinate system will have coordinates of (xbi, ybi, zbi) in the new coordinate system, so that $$\begin{pmatrix} x_{bi} \\ y_{bi} \\ z_{bi} \end{pmatrix} = \begin{pmatrix} \alpha_1 & \beta_1 & \gamma_1 \\ \alpha_2 & \beta_2 & \gamma_2 \\ \alpha_3 & \beta_3 & \gamma_3 \end{pmatrix} \begin{pmatrix} x_i \\ y_i \\ z_i \end{pmatrix} \quad (11)$$

Using this equation, a vertex point 14 with coordinates $(x_4, y_4, z_4)$ in the first coordinate system is transformed to a point with coordinates $(x_{b4}, y_{b4}, z_{b4})$ in the ball coordinate system as follows:

$$\begin{pmatrix} x_{b4} \\ y_{b4} \\ z_{b4} \end{pmatrix} = \begin{pmatrix} \alpha_1 & \beta_1 & \gamma_1 \\ \alpha_2 & \beta_2 & \gamma_2 \\ \alpha_3 & \beta_3 & \gamma_3 \end{pmatrix} \begin{pmatrix} x_4 \\ y_4 \\ z_4 \end{pmatrix} \quad (12)$$

The direction of the first optical axis 16 of the first surface of the lens component is transformed in a manner identical to the transformation for a point coordinate. If the first optical axis 16 has direction cosines $(\alpha_4, \beta_4, \gamma_4)$ in the first profilometer coordinate system, then it will have direction cosines in the ball coordinate system of $(\alpha_{b4}, \beta_{b4}, \gamma_{b4})$ where $$\begin{pmatrix} \alpha_{b4} \\ \beta_{b4} \\ \gamma_{b4} \end{pmatrix} = \begin{pmatrix} \alpha_1 & \beta_1 & \gamma_1 \\ \alpha_2 & \beta_2 & \gamma_2 \\ \alpha_3 & \beta_3 & \gamma_3 \end{pmatrix} \begin{pmatrix} \alpha_4 \\ \beta_4 \\ \gamma_4 \end{pmatrix} \quad (13)$$

As stated above, the coordinates of the points obtained during the second set of measurements made on the second surfaces 49, 52, 55 of the balls 41, 42, 43 and the second surface 18 of the lens component 10 can also be translated into the ball coordinate system using the equations similar to equations 1–13.

More specifically, the prime mark is used to denote measurements made on the balls 41, 42, 43 and lens component 10 after the turning operation. The unit vectors $\hat{x}b$, $\hat{y}b$, $\hat{z}b$ are defined as $\hat{x}b=(\alpha 1', \beta 1', \gamma 1')$ $$\hat{y}_b = (\alpha'_2, \beta'_2, \gamma'_2) \quad (13a)$$

$$\hat{z}_b = (\alpha'_3, \beta'_3, \gamma'_3)$$

$$\alpha'_1 = \frac{x'_2}{\sqrt{x'^2_2 + y'^2_2 + z'^2_2}} \quad (14a)$$

$$\beta'_1 = \frac{y'_2}{\sqrt{x'^2_2 + y'^2_2 + z'^2_2}} \quad (14b)$$

$$\gamma'_1 = \frac{z'_2}{\sqrt{x'^2_2 + y'^2_2 + z'^2_2}} \quad (14c)$$

where $x'_2$, $y'_2$, $z'_2$ are the coordinates of the second ball's center in the second coordinate system, as measured from the second surface. As stated earlier in the specification, vector $\hat{z}_b$ is a unit vector axis of the ball coordinate system and is defined by the cross product of the vector 91 and vector 92, normalized by the magnitude of the cross product $$\hat{z}_b = \frac{\text{vector } 91 \times \text{vector } 92}{|\text{vector } 91 \times \text{vector } 92|} \quad (15)$$

Since vector 91 extends from the origin to the point $(x'_2, y'_2, z'_2)$ and vector 92 extends from the origin to the point $(x'_3, y'_3, z'_3)$, it therefore follows that $$\hat{z}_b = \frac{(x'_2, y'_2, z'_2) \times (x'_3, y'_3, z'_3)}{|(x'_2, y'_2, z'_2) \times (x'_3, y'_3, z'_3)|} \quad (16)$$

$$\hat{z}_b = (\alpha'_3, \beta'_3, \gamma'_3) = \frac{(y'_2 z'_3 - z'_2 y'_3, x'_2 z'_3 - z'_2 x'_3, x'_2 y'_3 - y'_2 x'_3)}{|(y'_2 z'_3 - z'_2 y'_3, x'_2 z'_3 - z'_2 x'_3, x'_2 y'_3 - y'_2 x'_3)|} \quad (17)$$

Therefore, the direction cosines $\alpha'_3$, $\beta'_3$, $\gamma'_3$ of the unit vector $\hat{z}_b$, relative to the second set of measurements are:

$$\alpha'_3 = \frac{(y'_2 z'_3 - z'_2 y'_3, x'_2 z'_3 - z'_2 x'_3, x'_2 y'_3 - y'_2 x'_3)}{|(y'_2 z'_3 - z'_2 y'_3, x'_2 z'_3 - z'_2 x'_3, x'_2 y'_3 - y'_2 x'_3)|} \quad (18a)$$

$$\beta'_3 = \frac{(y'_2 z'_3 - z'_2 y'_3, x'_2 z'_3 - z'_2 x'_3, x'_2 y'_3 - y'_2 x'_3)}{|(y'_2 z'_3 - z'_2 y'_3, x'_2 z'_3 - z'_2 x'_3, x'_2 y'_3 - y'_2 x'_3)|} \quad (18b)$$

$$\gamma'_3 = \frac{(y'_2 z'_3 - z'_2 y'_3, x'_2 z'_3 - z'_2 x'_3, x'_2 y'_3 - y'_2 x'_3)}{|(y'_2 z'_3 - z'_2 y'_3, x'_2 z'_3 - z'_2 x'_3, x'_2 y'_3 - y'_2 x'_3)|} \quad (18c)$$

For a Cartesian coordinate system, $\hat{y}_b$ is defined as the cross-product of $\hat{z}_b$ and $\hat{x}_b$, so $$\hat{y}_b = (\alpha'_2, \beta'_2, \gamma'_2) = \hat{z}_b \times \hat{x}_b = (\alpha'_3, \beta'_3, \gamma'_3) \times (\alpha'_1, \beta'_1, \gamma'_1) \quad (19)$$

where $\alpha'_3$, $\beta'_3$, and $\gamma'_3$ are defined by equations 18a through 18c.

Substituting the known quantities from Equation (14a–14c) and Equation (18a–18c) in to Equation (19), we get the direction cosines for the y axis $\hat{y}_b$ in the ball coordinate system:

$$\hat{y}_b = \frac{(\beta'_3 \gamma'_1 - \gamma'_3 \beta'_1, \alpha'_3 \gamma'_1 - \gamma'_3 \alpha'_1, \alpha'_3 \beta'_1 - \beta'_3 \alpha'_1)}{|(\beta'_3 \gamma'_1 - \gamma'_3 \beta'_1, \alpha'_3 \gamma'_1 - \gamma'_3 \alpha'_1, \alpha'_3 \beta'_1 - \beta'_3 \alpha'_1)|} \quad (19)$$

The directions cosines for the y axis $\hat{y}_b$ are then:

$$\alpha'_2 = \frac{(\beta'_3 \gamma'_1 - \gamma'_3 \beta'_1)}{|(\beta'_3 \gamma'_1 - \gamma'_3 \beta'_1, \alpha'_3 \gamma'_1 - \gamma'_3 \alpha'_1, \alpha'_3 \beta'_1 - \beta'_3 \alpha')|} \quad (20a)$$

$$\beta'_2 = \frac{(\alpha'_3 \gamma'_1 - \gamma'_3 \alpha'_1)}{|(\beta'_3 \gamma'_1 - \gamma'_3 \beta'_1, \alpha'_3 \gamma'_1 - \gamma'_3 \alpha'_1, \alpha'_3 \beta'_1 - \beta'_3 \alpha')|} \quad (20b)$$

$$\gamma'_2 = \frac{(\alpha'_3 \gamma'_1 - \gamma'_3 \alpha'_1)}{|(\beta'_3 \gamma'_1 - \gamma'_3 \beta'_1, \alpha'_3 \gamma'_1 - \gamma'_3 \alpha'_1, \alpha'_3 \beta'_1 - \beta'_3 \alpha')|} \quad (20c)$$

Where $\alpha'_1$, $\beta'_1$, $\gamma'_1$, and $\alpha'_3$, $\beta'_3$, $\gamma'_3$ are defined by equation 14a–14c and 18a–18c.

Equations 12 and 13 supply the coordinates of the first vertex 14 and first optical axis 16 in the ball coordinate system. The equations for the transformation of the second vertex 20 and the second optical axis 22 are similar to equations 12 and 13 and are provided below.

$$\begin{pmatrix} x'_{b4} \\ x'_{b4} \\ x'_{b4} \end{pmatrix} = \begin{pmatrix} \alpha'_1 & \beta'_1 & \gamma'_1 \\ \alpha'_2 & \beta'_2 & \gamma'_2 \\ \alpha'_3 & \beta'_3 & \gamma'_3 \end{pmatrix} \begin{pmatrix} x'_4 \\ y'_4 \\ z'_4 \end{pmatrix} \quad (21)$$

and $$\begin{pmatrix} \alpha'_{b4} \\ \beta'_{b4} \\ \gamma'_{b4} \end{pmatrix} = \begin{pmatrix} \alpha'_1 & \beta'_1 & \gamma'_1 \\ \alpha'_2 & \beta'_2 & \gamma'_2 \\ \alpha'_3 & \beta'_3 & \gamma'_3 \end{pmatrix} \begin{pmatrix} \alpha'_4 \\ \beta'_4 \\ \gamma'_4 \end{pmatrix} \quad (22)$$

where $(x'_{b4}, y'_{b4}, z'_{b4})$ are the coordinates of the second vertex 20 in the ball coordinate system, and $(\alpha'_{b4}, \beta'_{b4}, \gamma'_{b4})$ are the direction cosines of the second optical axis 22 in the ball coordinate system.

Since the centers 50, 53, 56 of the three balls 41, 42, 43 uniquely define the ball coordinate system (independent of the relative movement of the plate 31 and regardless whether these centers are measured from their first surfaces or their second surfaces), the coordinates of the vertices 14, 20 and direction cosines for the optical axes 16, 22 are now provided in the same coordinate system which is defined by the unit vectors $\hat{x}b$, $\hat{y}b$, $\hat{z}b$. Since the directions of optical axis of the lens elements are now provided in the same coordinate system—i.e., the ball coordinate system, one can easily calculate wedge—i.e., the relative tilt of one optical axis with respect to another optical axis. The wedge 24 between axes 16 and 22 (see FIG. 1), referred to as θ, is $$\theta = \cos^{-1}(\alpha_{b4}\alpha'_{b4} + \beta_{b4}\beta'_{b4} + \gamma_{b4}\gamma'_{b4}) \quad (23)$$

Figure 7:
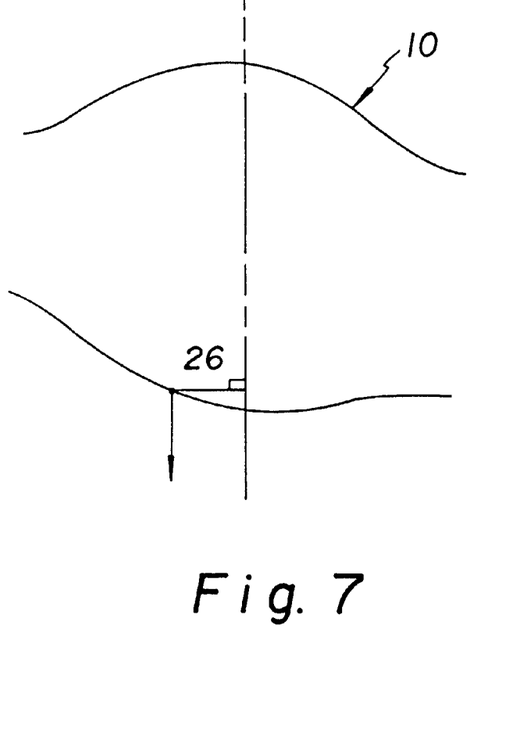
FIG. 7 schematically illustrates a cross section of the lens component of FIG. 1 and shows two surfaces and their respective vertices. The two surfaces are decentered with respect to one another.

FIG. 7 shows a diagram displaying the decenter distance 26 between the first optical axis 16 and the second vertex 20 of the second surface 18. Using the equation for the distance from a point to a line through a point in a particular direction the decenter distance 26 (denoted by D) is $$D = \left[ \frac{\left| \begin{matrix} y'_{b4} - y_{b4} & z'_{b4} - z_{b4} \\ \beta_{b4} & \gamma_{b4} \end{matrix} \right|^2 + \left| \begin{matrix} z'_{b4} - z_{b4} & x'_{b4} - x_{b4} \\ \gamma_{b4} & \alpha_{b4} \end{matrix} \right|^2 + \left| \begin{matrix} x'_{b4} - x_{b4} & y'_{b4} - y_{b4} \\ \alpha_{b4} & \beta_{b4} \end{matrix} \right|^2}{\alpha'^2_{b4} + \beta'^2_{b4} + \gamma'^2_{b4}} \right]^{\frac{1}{2}} \quad (24)$$

This completes step 400 of FIG. 5.

Figure 8:
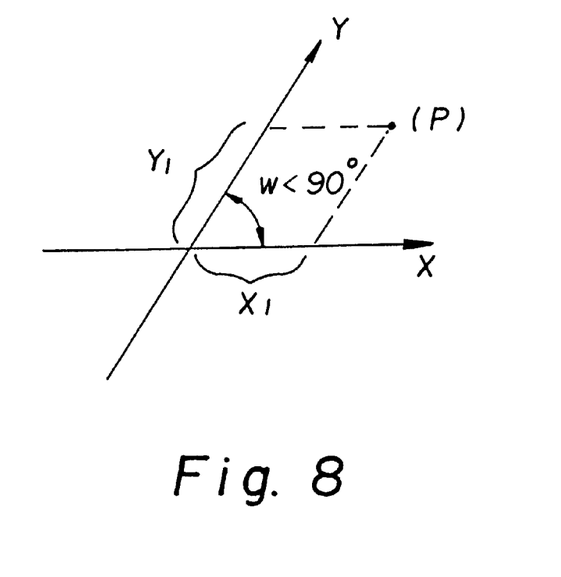
FIG. 8 illustrates an oblique coordinate system.

It is noted that more than three reference bodies could also be used. For example, the above operations can be performed on two sets of three reference bodies. The redundancy given by an extra set of reference bodies could be used to improve the accuracy of the measurements. The above operations could also be performed in a non-Cartesian coordinate system. An example of a non-Cartesian coordinate system that might be used is an oblique coordinate system. An oblique coordinate system is one where the unit axes are not at right angles. FIG. 8 illustrates an oblique coordinate system. This coordinate system has two axes x and y, with an angle w between the axes. The angle W is not a 90 degree angle. The point P is described by the coordinates $x_1$ and $y_1$, of this coordinate system.

Figure 9:
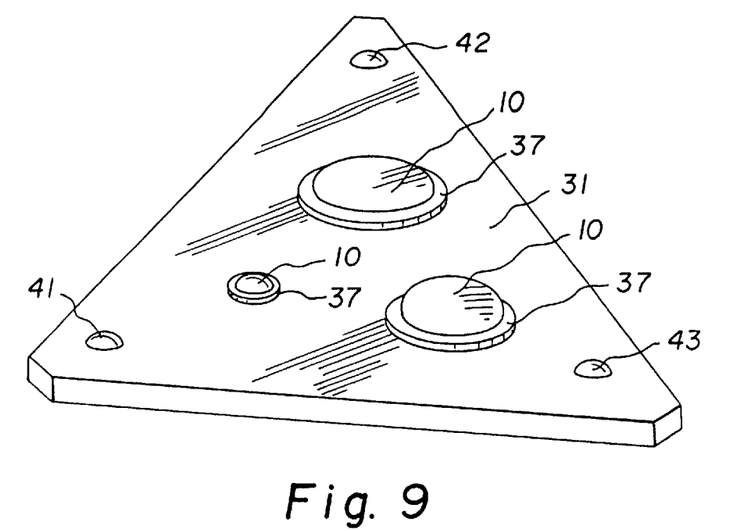
FIG. 9 illustrates a plate of the test fixture with multiple lens components being held in mounts situated in the plate.
Figure 10A:
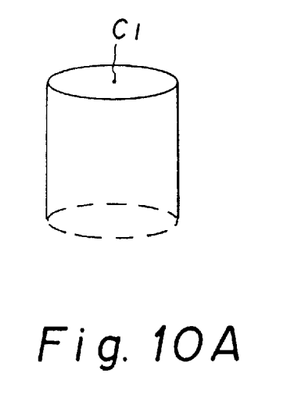
FIGS. 10A, 10B, and 10C illustrate other reference bodies.
Figure 10B:
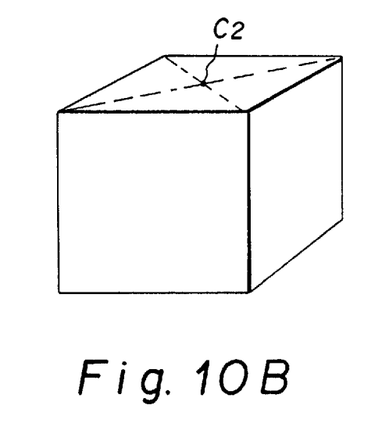
Figure 10C:
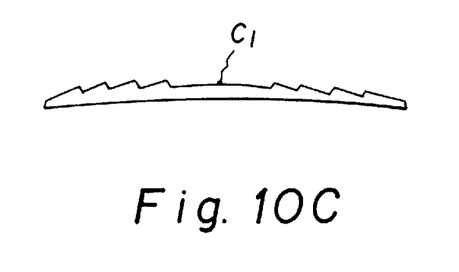

An important advantage of the first embodiment is that the test fixture 30 (including the plate 31 with three reference bodies such as balls 41, 42, 43) allows the technician to accurately relate the measurements performed on the first surface 12 of the lens component 10 to the measurements performing on the second surface 18 of the lens component 10. A second important advantage of this embodiment is that the measurements on the first surface 12 of the lens component 10 and the measurements on the second surface 18 of the lens component 10 do not rely on accurate placement of balls 41, 42, 43 and the lens component 10 on the seat of the profilometer. A third important advantage of this embodiment is that a wide range of lens component sizes can be measured with the use of this test fixture. The same lens test fixture 30 can be used with a variety of lens components that fit in the same mount 37. The plate 31 can also be used to measure different sized lens components if different lens mounts are used. Such lens mounts could hold more than one lens of the same or different sizes. As a further example, the plate 31 could hold more than one mount, and each mount could be of a size to fit a different type of lens. This is illustrated in FIG. 9. The only restriction is that the lens components and the reference bodies fit within the measurement volume of the profilometer. For example, if the probe can move only over a certain size region, the reference bodies and the lens or lenses to be measured must be located within that region. It is preferred that the reference bodies have a surface shape that does not greatly deviate from a spherical shape. Balls with a deviation from a spherical shape of less than 0.000010 inches are available from Ball Supply Corporation of Avon, Conn. Although the use of spherical balls as reference bodies is preferred, reference bodies other than balls could be used. Such other reference bodies might be cubes, cylinders or Fresnel lens structures. The center $C_1$, $C_2$ of such reference bodies could be used instead of the ball centers (see FIGS. 10A, 10B and 10C).

It is preferred that during the first set of measurements (i.e. while measuring the first surfaces of the reference bodies and the first surface of the lens components) the test fixture 30 does not translate or rotate. This is also true for the second set of measurements. That is, it is important that the positions of the reference bodies and the lens components do not undergo unknown motion during the measurements. However, the test fixture may translate or rotate between the two sets of measurements because the relative position of the reference bodies and the lens components remain unchanged.

It is preferred that the test fixture be able to be repeatedly placed in a predetermined place at the seat 66 of the profilometer. In the first embodiment, the reference bodies provide the means for repeatably placing the plate 31 in the seat 66 within the profilometer 64 by utilizing a kinematic coupling. A kinematic coupling is a coupling between a fixed seat and a removable object (i.e. plate 31), such that the object contacts the seat at a number of support points. In order for the object to be prevented from translating or rotating, the number of support points must be 6 (since every object can translate in 3 directions and rotate about 3 axes.) If the object is permitted to move in one direction, the number of support points would be 5. For a further explanation of kinematic mounts, see S. T. Smith and D. G. Chetwynd, Foundations of Ultraprecision Mechanism Design, pg. 48, Gordon & Breach, 1991. More specifically, in this embodiment, the kinematic coupling is formed by three grooves 69, 70, 71 on the seat 66 (see FIG. 11) and the three balls 41, 42, 43 in the plate 31. The seat 66 may be screwed into the profilometer 64 and may be removed once the required number of measurements is completed.

The grooves in the seat 66 prevent the balls 41, 42, 43 in the plate 31 from translating or rotating, and cause the plate 31 to be located at a nearly identical position every time the plate 31 is placed into the seat 66. This reduces time needed in performing measurements with the profilometer 64.

Figure 12:
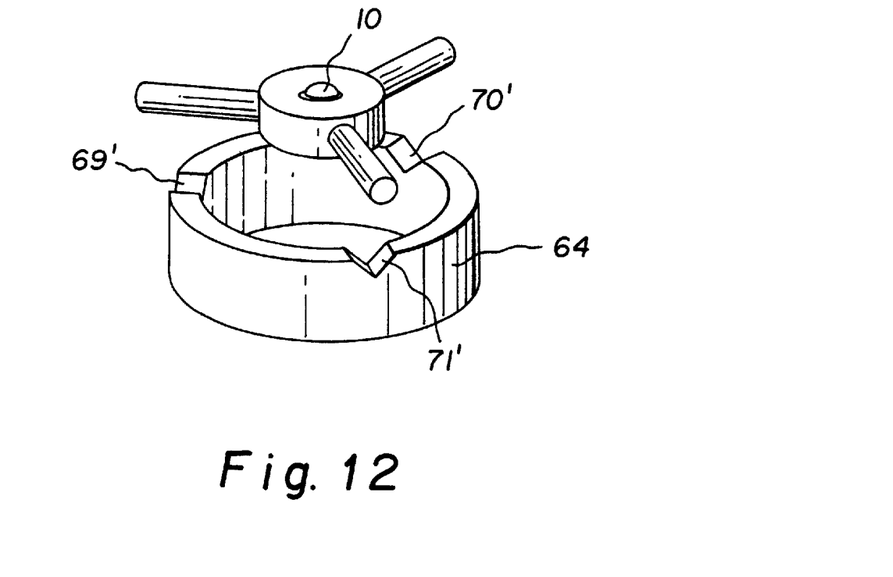
FIG. 12 illustrates an alternative method of forming a kinematic seat.

The seat 66 may have some other receptive features 69, 70, 71 (instead of grooves) for the balls or other types of reference bodies (see FIG. 12). The advantage of a kinematic coupling is that the plate 31 is in approximately the same position every time it is used in a particular orientation.

In the first embodiment, the kinematic coupling makes the operation more convenient, but the accuracy of measurements obtained by the above described method does not depend on the reliability or accuracy of the kinematic mount. Since the reference balls are measured every time the plate 31 is placed into the seat 66, the first embodiment does not rely upon the accurate seating of the plate 31 in a particular position. What is important is that the positioning of the reference bodies with respect to one another and with respect to the lens component is accurately determined. The 1$^{st}$ embodiment utilizes the kinematic mount merely to prevent the motion of the plate while the measurements are being taken and to reduce the time needed to perform the measurements.

A second embodiment is similar to the first embodiment, except a very reliable and accurate kinematic mount is required As stated above, this is not a necessary feature of the first embodiment, because in the first embodiment the surfaces of the balls were measured before and after the plate 31 was turned over to determine the centers of the balls. In this, second embodiment, the plate 31 sits in a predetermined position both before and after it is turned over, such that measurement of the surfaces of the balls to determine the location of the ball centers is not required. Therefore, the test fixture 30 is required to repeatedly sit in its predetermined positions for the two sets of measurements (the first set occurring before turning over, and the second set occurring after turning over of the test fixture).

Figure 11:
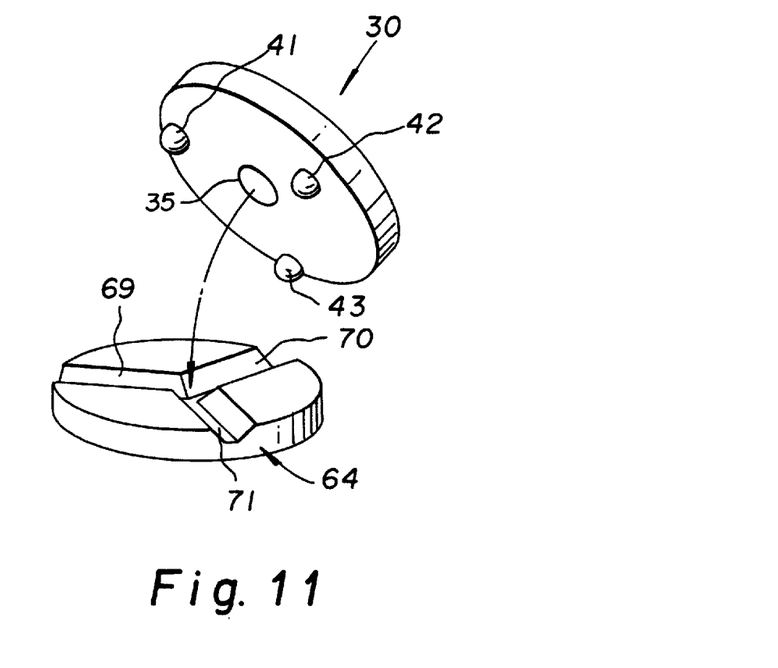
FIG. 11 illustrates a kinematic seat formed with balls and grooves for receiving the balls.

According to one example of this embodiment, the test fixture 30 repeatably seats in the set grooves. Therefore it is not necessary to repeatedly measure the location of the balls. Instead, the ball locations can be measured once, and the ball locations will be assumed to be in the exact same location, when the plate is reseated. FIG. 11 displays a kinematic mount in more detail. In order for the kinematic mount to provide reliable seating for the test fixture 30 31, the mount must be kept very clean.

Figure 13:
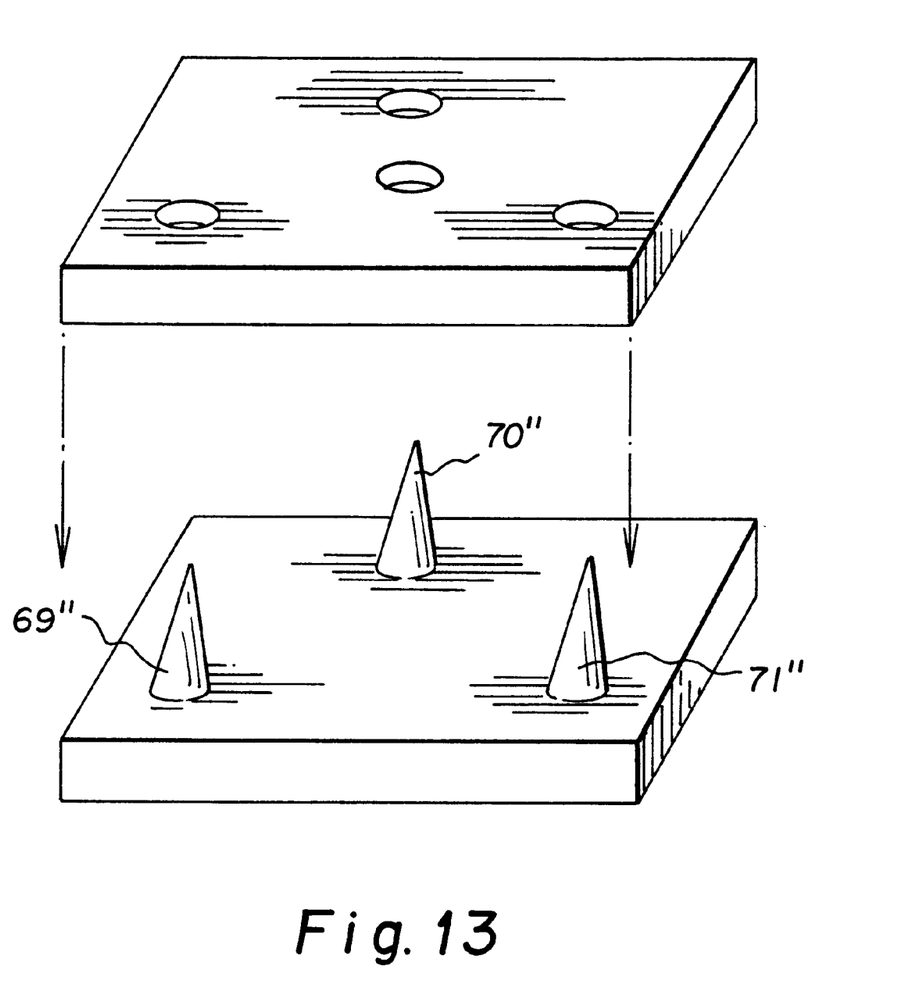
FIG. 13 illustrates an alternative method of mounting the test fixture into a seat.

According to another example of this embodiment, the test fixture 30 does not have reference bodies such as balls. Instead, the plate 31 of the test fixture 30 may have a plurality of features 69', 70', 71' or 69", 70", 71" which engage a plurality of complementary features on a seat 66 such that the test fixture 30 is fixedly mounted on the seat. (See FIGS. 12 and 13). Since the location of these plurality of features and thus the location of the plate is predetermined, one needs to only measure the surface profile and orientation of each the first and second surface of optical component to determine the relative orientation with respect to one another.

Figure 14:
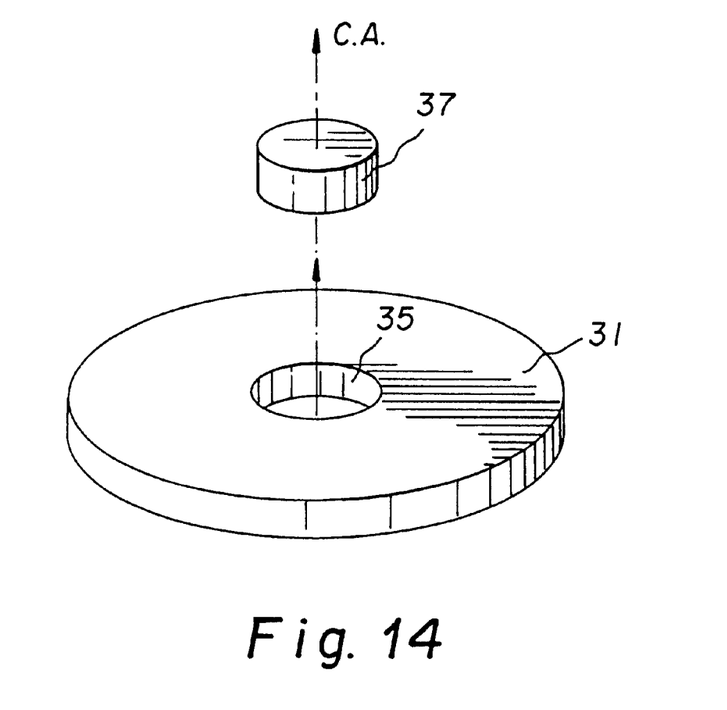
FIG. 14 illustrates a third embodiment of the present invention.

According to a third embodiment, the lens component is mounted in a mount 37 which has a high accuracy outer surface in the shape of a cylinder. Such a surface would deviate from a true cylinder by less than 0.0002 inches. The mount will fit tightly into a hole 35 in the plate 31, such that any lateral movement of the cylindrical outer surface within the hole is essentially impossible (see FIG. 14). After measuring one surface of the lens component, the mount (and not the plate) is turned over to allow measuring the second surface of the lens. Because the central axis (C.A.) of the mount is constrained in both sets of measurements and its location is known, the relative angular orientation of each of the optical axes 16, 22 with respect to the central axis of the mount is calculated, and the relative position of the two vertices and the two axes can be easily determined. However, the mount turning operation would require that plate be stationary. It is noted that the repeated operations of taking out, turning over, and placement of the cylindrical mount in and out of the plate 31 could introduce dirt into the hole 35 of the plate. This may degrade the accuracy of the mounting.

Figure 15:
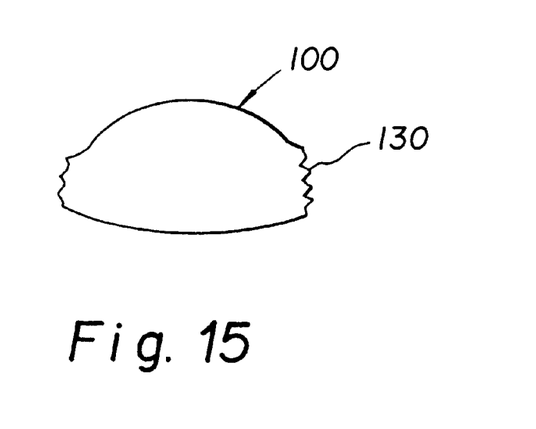
FIG. 15 illustrates a molded glass element with excess glass on its edges.

The above described apparatus and method can be used to measure the relative locations of surfaces of lens components with excess glass or plastic 130 at their edges (see FIG. 15). Such lens components may result from a molding process. Although the excess glass or plastic can be removed in a later edging operation, it would be desirable for improved control of the molding process to measure the wedge and decenter between the two optical axes before the excess material is removed.

It is an advantage of the present invention that the apparatus and a method described above is capable of measuring not only the relative orientation of the two surfaces of a typical lens component, but is also capable of measuring the position of diffractive or Fresnel lens surfaces relative to one another. For example, this apparatus and a method may determine the location of Fresnel features fabricated on one side of a component relative to Fresnel features fabricated on the other side of the component. The relative position of microlenses on two sites of an optical component may also be determined by this method.

Certain profilometers use optical methods to measure the shape of a surface. Such profilometers are available from the UBM Corporation 568 Weddell Drive, Suite 6, Sunnyvale, Calif. 94089. These profilometers utilize an optical beam which is focused onto the surface to be measured. If such an optical profilometer is used, a preferred embodiment of the invention would utilize reflecting reference bodies such as reflecting spheres. If a mechanical profilometer is used, then either non-reflecting or reflecting bodies could be used.

The invention has been described in detail with particular reference to certain preferred embodiments thereof, but it will be understood that variations and modifications can be effected within the spirit and scope of the invention.

PARTS LIST 10 lens component
12 First surface of lens component
14 First vertex
16 First optical axis
18 Second surface of lens component
20 Second vertex
22 Second optical axis
24 Angular displacement between axes (commonly called wedge)
26 Decenter between axes
30 Lens test fixture
31 Plate
32,33,34,35 Holes
36A First surface of plate
36B Second surface of plate
37 Lens mount
41 Ball-1
42 Ball-2
43 Ball-3
48 First surface of ball-1
49 Second surface of ball-1
50 Center of ball-1
51 First surface of ball-2
52 Second surface of ball-2
53 Center of ball-2
54 First surface of ball-3
55 Second surface of ball-3
56 Center of ball-3
64 Profilometer 65A Processor
65B Monitor
65C Printer
66 Seat
68 Probe
69,70,71 Grooves in seat
80 Origin
91 Vector from origin of ball coordinate system to center of second ball
92 Vector from origin of ball coordinate system to center of third ball
130 Excess glass

What is claimed is:

1. A method for determining orientation of one surface of an optical component relative to another surface of the optical component, said method comprising the steps of:
   placing the optical component into a test fixture so that said one surface of said optical component is accessible in a first orientation of the test fixture and said another surface of said optical component is accessible in a second orientation of said test fixture;
   measuring surface profile and orientation of said one surface of said optical component with said test fixture in the first orientation;
   measuring surface profile and orientation of said second surface of said optical component with said test fixture in the second orientation; and
   determining profile and relative orientation of said one surface of said optical component with respect to said another surface of said optical component by compensating for differences between said first and second orientation of said test fixture.

2. A method for determining orientation of one surface of an optical component relative to another surface of the optical component, said method comprising the steps of
   placing the optical component into a test fixture having features from which differences in test fixture orientation and position can be determined, so that said one surface of said optical component is accessible in one orientation of the test fixture and said another surface of said optical component is accessible in another orientation of said test fixture;
   measuring surface profile and orientation of said one surface of said optical component with said test fixture in said one orientation, and determining the location of said first surface on said test fixture using said characteristics;
   turning over the test fixture with the optical component;
   measuring surface profile and orientation of said another surface of said optical component and determining the location of said another surface of said optical components on said test fixture using said features; and
   determining relative orientation and position of said one surface of said optical component with respect to said another surface of said optical component by knowing the location of each of said surfaces of said optical component on said test fixture.

3. A method for measuring a wedge of two surfaces of an optical component that are on the opposite sides of said optical component, said method comprising the steps of:
   providing a plate with a plurality of reference bodies and a receptacle for receiving an optical component;
   placing an optical component in said receptacle;
   measuring surface profile of
   (i) a first surface of said optical component, and
   (ii) a first surface of each of said reference bodies;
   determining locations of said reference bodies and said first surface of said optical component;
   turning said plate over;
   measuring surface profile of
   (i) a second surface of each of said reference bodies, and
   (ii) a second surface of said optical component;
   determining locations of said reference bodies after said plate has been turned over and determining location of said second surface of said optical component; and
   determining, from the location of said reference bodies and their position relative to said first and second surfaces of said optical component, relative location of said first surface of said optical component with respect to said second surface of said optical component and determining the relative orientation of an optical axis of said first surface of said optical component with respect to an optical axis of said second surface of said optical component.

4. A method according to claim 3 wherein bodies are a plurality of balls.

5. A method according to claim 4 wherein the a spherical shape for said balls is less than 0.000010 inches.

6. A method according to claim 3 wherein said reference bodies are spherical and reflecting.

7. A method for determining relative location of features located on two sides of a component, said method comprising:
   providing a plate with a plurality of reference bodies and a mount for receiving a component located in said plate;
   placing the component in said mount;
   measuring location of features on one side of the component and measuring at least one surface of each of said reference bodies to determine locations of said reference bodies;
   measuring location of features on another side of the component and measuring at least another surface of each of said reference bodies to determine locations of said reference bodies; and
   determining the relative location of features on one surface with respect to the features on the other surface from the locations of said reference bodies.

8. A device comprising a profilometer with a probe and a seat; a plate located on said seat and having
   (i) a plurality of reference bodies extending through said plate and accessible by said probe from two sides of said plate; and
   (ii) a receptacle in said plate, said receptacle being adapted to receive said component such that it is accessible from said two sides of said plate.

9. The device according to claim 8 having at least three reference bodies.

10. The device according to claim 8 wherein said reference bodies are a plurality of cubes.

11. The device according to claim 8 wherein said reference bodies are a plurality of cylinders.

12. A device according to claim 8 wherein said reference bodies are a plurality of balls.

13. A holder for an optical component, said holder comprising:
   a plate with at least three balls, said balls (i) being mounted in said plate; and (ii) protruding from two opposing sides of said plate; and
   a hole extending through said plate, such that the optical component placed in said hole is accessible from said two opposing sides of said hole.

* * * * *